US008550833B2

(12) United States Patent
Martin

(10) Patent No.: US 8,550,833 B2
(45) Date of Patent: Oct. 8, 2013

(54) LOCKING APPARATUS FOR ELECTRIC VEHICLE CHARGING CONNECTOR

(75) Inventor: Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 13/268,134

(22) Filed: Oct. 7, 2011

(65) Prior Publication Data

US 2013/0089999 A1    Apr. 11, 2013

(51) Int. Cl.
H01R 13/62    (2006.01)

(52) U.S. Cl.
USPC .............................. 439/310; 439/372; 439/34

(58) Field of Classification Search
USPC .................... 439/310, 372, 347, 34; 320/109
See application file for complete search history.

(56) References Cited

U.S. PATENT DOCUMENTS

| 3,904,947 | A | | 9/1975 | Crews |
| 5,350,312 | A | | 9/1994 | Kuno et al. |
| 5,417,579 | A | | 5/1995 | Yoshioka et al. |
| 5,458,496 | A | | 10/1995 | Itou et al. |
| 5,545,049 | A | | 8/1996 | Hasegawa et al. |
| 5,627,448 | A | * | 5/1997 | Okada et al. ................. 439/133 |
| 5,674,086 | A | | 10/1997 | Hashizawa et al. |
| 5,676,560 | A | | 10/1997 | Endo et al. |
| 5,711,558 | A | | 1/1998 | Woody |
| 6,123,569 | A | | 9/2000 | Fukushima et al. |
| 6,203,355 | B1 | | 3/2001 | Neblett et al. |
| 6,371,768 | B1 | | 4/2002 | Neblett et al. |
| 6,520,782 | B2 | | 2/2003 | Mori |
| 8,333,601 | B2 | * | 12/2012 | Nakashima ................... 439/160 |
| 2008/0185991 | A1 | | 8/2008 | Harris et al. |
| 2009/0000835 | A1 | | 1/2009 | Jones et al. |
| 2009/0082916 | A1 | | 3/2009 | Tanaka |
| 2009/0286414 | A1 | | 11/2009 | Ohtomo |
| 2010/0013434 | A1 | | 1/2010 | Taylor-Haw et al. |
| 2011/0034053 | A1 | | 2/2011 | Matsumoto et al. |

FOREIGN PATENT DOCUMENTS

| DE | 102007002025 A1 | 7/2008 |
| JP | 7115710 A | 5/1995 |
| JP | 10262303 A | 9/1998 |

(Continued)

OTHER PUBLICATIONS

Great Britain, Search Report for the corresponding Great Britain Application No. GB1108761.6 mailed Sep. 23, 2011.

(Continued)

*Primary Examiner* — Hien Vu
(74) *Attorney, Agent, or Firm* — David B. Kelley; Brooks Kushman P.C.

(57) ABSTRACT

A security apparatus for preventing unauthorized disengagement of a charging connector from a charge port of an electric vehicle, for example during the battery charging process. A lock member is disposed on the electric vehicle and is movable between a locked position wherein it inhibits disengagement of the charging connector from the charge port and an unlocked position wherein it allows disengagement of the connector from the port. A locking actuator located adjacent to the charge port is manually actuatable to move the lock member to the locked position. An unlock actuator disposed inside a vehicle cabin is manually actuatable to move the lock member to the unlocked position. This ensures that only a person with access to the interior of the vehicle can unlock and disengage the charging connector from the vehicle.

16 Claims, 3 Drawing Sheets

(56) References Cited

FOREIGN PATENT DOCUMENTS

| WO | 2010115927 A1 | 10/2010 |
| WO | 2010115972 A1 | 10/2010 |
| WO | 2011000776 A1 | 1/2011 |
| WO | 2011062004 A1 | 5/2011 |
| WO | 2011092431 A1 | 8/2011 |

OTHER PUBLICATIONS

Web2PDf, Yazaki Connectors Simplify and Optimize, InitellTow Trademark.

* cited by examiner

LOCKING APPARATUS FOR ELECTRIC VEHICLE CHARGING CONNECTOR

TECHNICAL FIELD

The present invention relates to electrically powered vehicles that are recharged while stationary using a detachable charging connector and cable arrangement, and more particularly to a novel apparatus for preventing unauthorized disengagement of the connector from the charging port.

BACKGROUND

Battery electric vehicles, plug-in hybrid electric vehicles, and fuel cell vehicles generally include a high-voltage storage battery. In operation, the storage battery provides electric power to operate various components in the vehicle, such as an electric motor for driving traction wheels of the vehicle. The state-of-charge (SOC) of the battery decreases when the storage battery loses electric charge or discharges, which occurs primarily due to operation of the vehicle. When the storage battery discharges, it may be desirable or necessary to recharge the storage battery. Consequently, a power source external to the vehicle is often used to charge the storage battery to increase the overall SOC of the storage battery.

Various connector assemblies have been proposed to electrically connect the storage battery to the off-board power source for charging the storage battery. For example, the connector assembly may include a vehicle-side connector housing and vehicle-side terminals, which are often referred to together as the charge port. The charge port is often mounted on the body of the vehicle and the terminals are electrically connected to the storage battery of the vehicle. In addition, the connector assembly may include a power-source-side charging connector generally comprising a power-source-side connector housing and power-source-side terminals. The power-source-side connector housing mates with the vehicle-side connector housing so that the power-source-side terminals can connect to the vehicle-side terminals.

After mating of the charging connector and the charge port, a person may not want to closely supervise the battery charging process. For example, the person may not want to attend to ensuring the charging connector and the charge port remain properly mated during charging of the battery. Similarly, the person may not wish to attend to preventing other, unauthorized persons from interrupting charging of the battery.

After mating of the charging connector and the charge port, theft prevention or deterrence may be desirable or necessary. For example, preventing or deterring theft of the charging connector and/or the associated power cable. Furthermore, it may be beneficial to prevent or deter theft of electric power output from the charging source via the charging connector. For example, this may occur at a charging station when a first person leaves the vehicle unattended at the charging station and a second, unauthorized person decides to charge his vehicle using electric power owned by, paid for by, or otherwise associated with the first person.

SUMMARY

Various embodiments of a system and apparatus are provided for preventing unauthorized disengagement between a charging connector and a charge port or receptacle on an electric vehicle.

According to a feature disclosed herein, locking apparatus for securing a charging connector to a charge port of an electric vehicle comprises a lock member disposed on the electric vehicle and movable between a locked position wherein it inhibits disengagement of the connector from the port and an unlocked position wherein it allows disengagement of the connector from the port. A locking actuator is located adjacent to the charge port and is manually actuatable to move the lock member to the locked position. An unlock actuator is disposed inside a vehicle cabin and is manually actuatable to move the lock member to the unlocked position. This allows a person to simply and easily lock the charging connector into engagement with the charge port at the start of the charging process, and ensure that only a person with access to the interior of the vehicle can unlock and disengage the charging connector from the vehicle.

According to another feature disclosed herein, apparatus for charging a battery of an electric vehicle comprises a charge port for mounting on the electric vehicle and a charging connector engageable with the charge port and that may be locked into engagement with the charge port. Locking is achieved by a lock member associated with the charge port and movable between a locked position wherein it contacts the connector to inhibit disengagement of the connector from the charge port and an unlocked position wherein it allows disengagement of the connector from the charge port. A locking actuator is accessible outside of the vehicle and is manually actuatable to move the lock member to the locked position. An unlock actuator is accessible inside a vehicle cabin and is manually actuatable to move the lock member to the unlocked position.

According to another feature disclosed herein, apparatus for locking a charging connector to a charge port of an electric vehicle comprises a lock member disposed on the electric vehicle adjacent the charging connector and having an unlocked position wherein it allows disengagement of the connector from the port, the lock member manually movable from outside the vehicle to a locked position wherein it inhibits disengagement of the connector from the port and; and an unlock actuator disposed inside a vehicle cabin and manually actuatable to move the lock member to the unlocked position.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
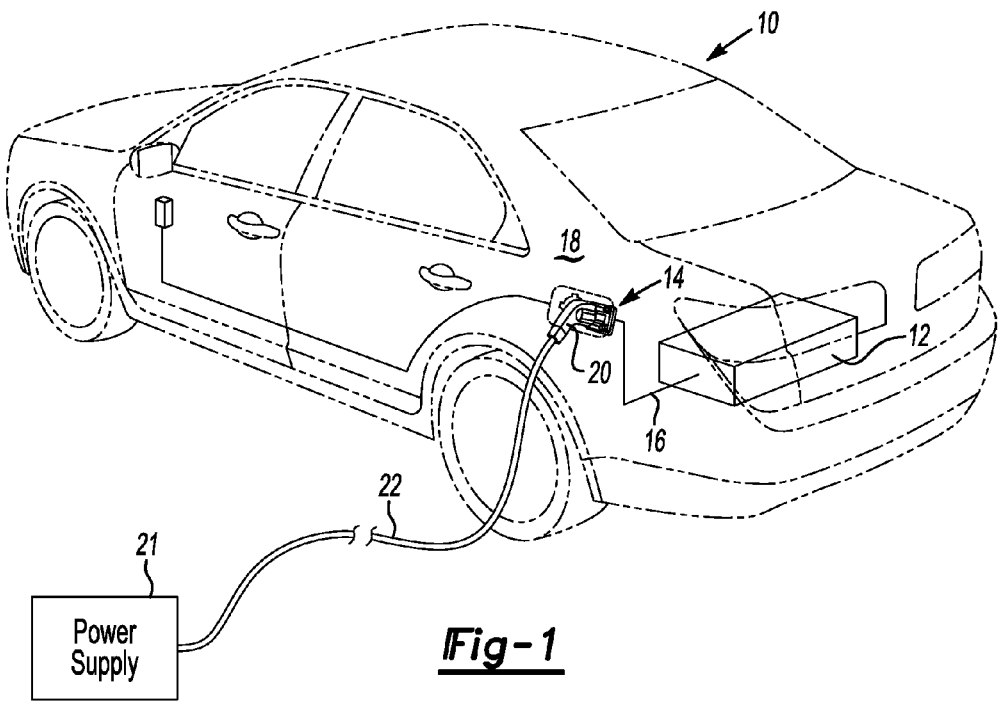
FIG. 1 is a schematic diagram illustrating an electric vehicle with a charge port and a charging connector in accordance with one embodiment.

With reference to FIG. 1, an electric vehicle 10 (hereinafter "vehicle") is provided with an on-board battery 12, a charge port 14, and internal electrical connection 16 between the battery and charge port. Charge port 14 is located in or on a body panel 18 and may include a hinged or otherwise movable cover (not shown) that may be closed to hide the charge port when it is not in use. Vehicle 10 may be any type of electric vehicle having a charge port 14 for receiving electrical power, such as a plug-in electric vehicle, a plug-in hybrid electric vehicle, a battery electric vehicle, a fuel cell vehicle, etc.

A charging connector 20 is operatively engaged with charge port 14 to permit the transfer of electric energy from an off-board power supply 21 to the battery 12. Power supply 21 may be a home power outlet or charging station, for example. Power cable 22 extends from the power supply to charging connector 20, and when the charging connector is properly engaged with charge port 14 electrical connection is maintained between power supply 21 and battery 12. Other power-conditioning apparatus (not shown) may be associated with battery 12, as is well known in the electric vehicle art. Other conductive cables or devices may be used in place of or in addition to power cable 22 to electrically connect the power supply 21 and charging connector 20.

Figure 2:
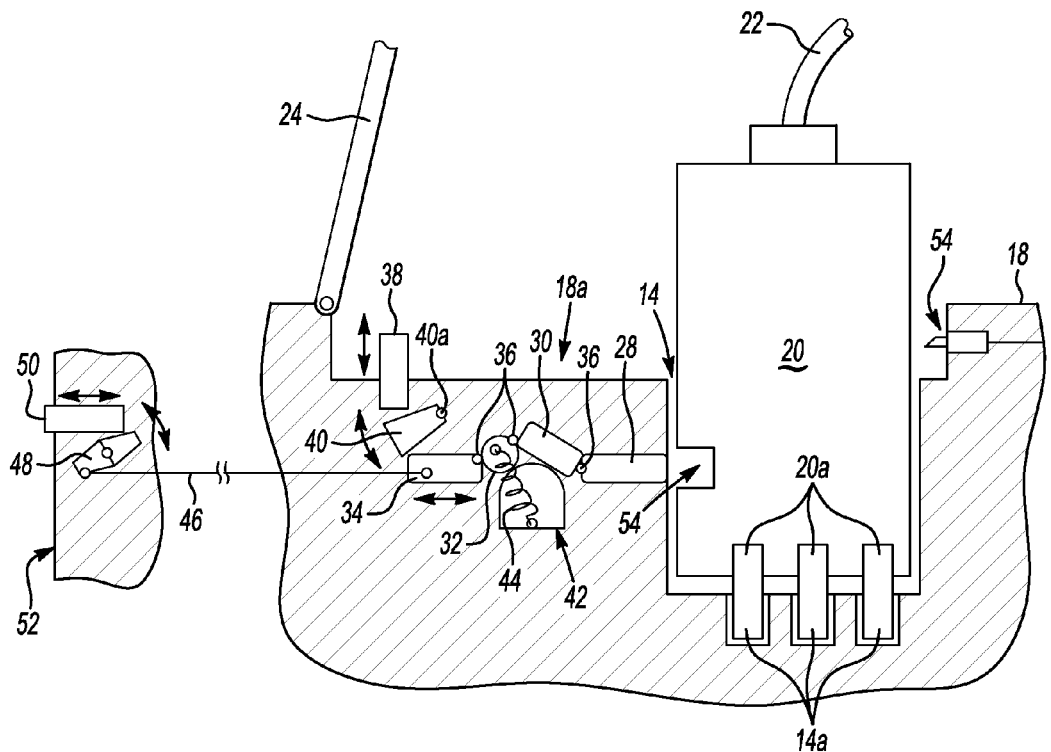
FIG. 2 is a schematic diagram illustrating a charging connector and charge port on the vehicle in an intermediate condition.

With reference to FIG. 2, a battery charging security apparatus is shown, in schematic form, to include a charging connector 20 engaged with a charging port 14 disposed in or on a vehicle exterior body panel 18. Charge port 14 is schematically depicted as being located in a recessed area 18a on body panel 18. Recessed area 18a may be optionally covered by a hinged door 24 when not in use in order to conceal charge port 14. Charging connector 20 is shown fully inserted into charge port 14 so that terminals 20a of the connector are in electrical contact with mating terminals 14a of the receptacle, but with the locking apparatus in an unlocked position/condition.

The locking apparatus comprises a locking member 28, a first toggle 30, a follower 32, and a second toggle 34. Locking member 28 is retained by appropriate guide structure (not shown) for linear movement in a horizontal (left/right) direction as schematically viewed in FIG. 2. Components 28-34 are interconnected by pins 36 or similar means to permit angular movement between adjacent components. A locking actuator 38 is movable relative to the vehicle body structure in a vertical direction as schematically viewed in FIG. 2. A rotating link 40 is mounted to the vehicle body structure for pivoting movement about pivot point 40a. Downward movement of locking actuator 38 forces rotating link 40 into contact with second toggle 34.

A cam surface 42 is rigidly mounted to the vehicle body structure. Follower 32 is urged into contact with cam surface 42 by a biasing element 44, such as a tension spring, but is able to slide over the cam surface, as will be described more fully below. Biasing element 44 holds follower 32 in an over-center position to the left (as viewed in FIG. 2) of a neutral position at the highest point of cam surface 42.

An inextensible member 46 (such as a wire, cord, or cable) is connected to second toggle 34 and extends to a location within the interior of the vehicle, preferably the passenger compartment, where it is attached to a pivoting unlock toggle 48. An unlock actuator 50 is mounted on an interior panel 52 and is movable relative thereto to exert a pivoting force on unlock toggle 48, as will be described herein below.

Interior panel 52 and unlock actuator 50 maybe located at any location within the vehicle 10 that is conveniently accessible to a vehicle operator or other person authorized to undertake or supervise recharging of the vehicle battery 12. Unlock actuator 50 is preferably located within the passenger compartment where access to it may be controlled by locking the vehicle doors so that only a person able to unlock the vehicle can operate the unlock actuator 50.

Door 24 that covers recessed area 18a, charge port 14, and locking actuator 38 may have a locking/latching system generally indicated at 54 that may be of a type well known in the automotive art. Door locking/latching system 54 may be unlocked/unlatched either manually or by a central vehicle locking system (not shown).

Figure 3:
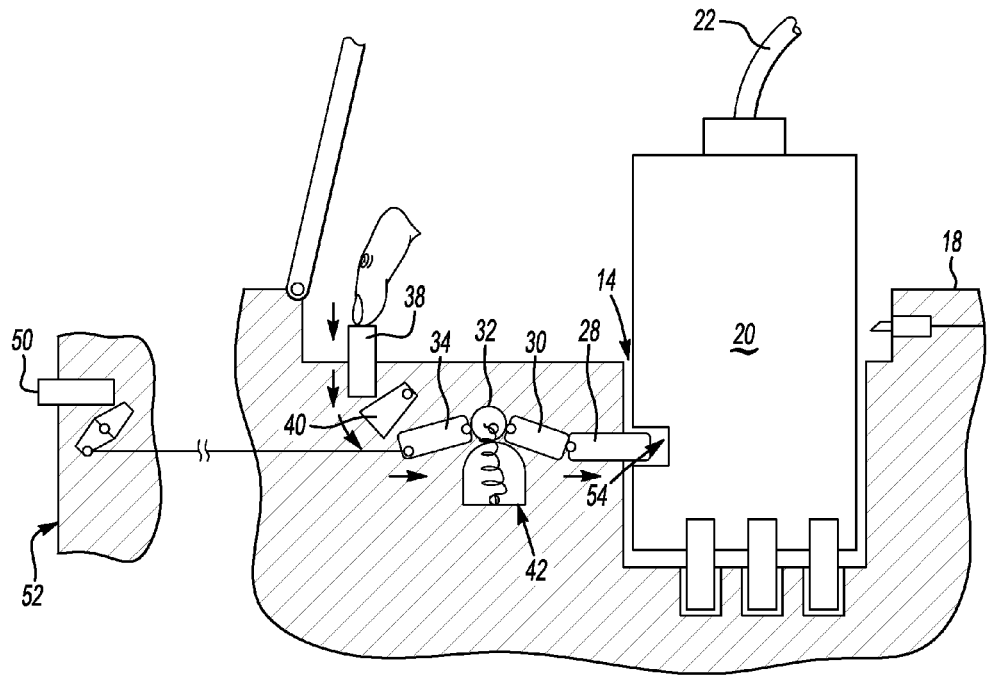
FIG. 3 is a schematic diagram illustrating the charging connector and charge port of FIG. 2 in a locked condition.

Referring now to FIG. 3, the apparatus of FIG. 2 is shown part way through the locking process. To lock charging connector 20 into engagement with charge port 14 a vehicle operator or other person authorized to deal with charging the vehicle battery presses downward on locking actuator 38 when the charging connector is fully inserted into the charge port. Downward movement of locking actuator 38 causes rotating link 40 to pivot counter clockwise as shown and thereby urge second toggle 34 to the right as shown by the arrows. The left end of second toggle 34 is retained by appropriate guide structure (not shown) for linear movement in a horizontal (left/right) direction as schematically viewed in FIG. 3, but the right end of the second toggle is not so constrained but rather may move upwardly as the toggle is urged to the right.

As second toggle 34 moves to the right, it forces follower 32 to slide over cam surface 42 and biasing element 44 stretches to allow the follower to move up toward the neutral position or center point of the cam surface. Since components 28-34 are connected by pins 36, first toggle 30 and locking member 28 are also urged to the right, as seen in FIGS. 2 and 3, so that the locking member begins to extend into the opening of charge port 14 and into engagement with a notch 54 formed in charging connector 20.

Figure 4:
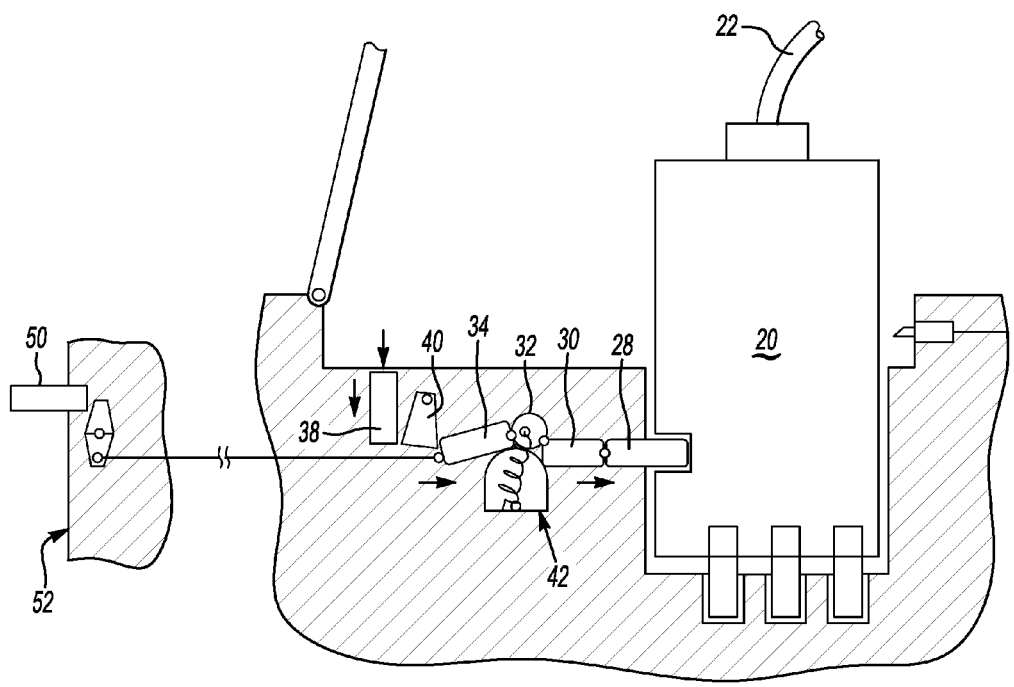
FIG. 4 is a schematic diagram of the charging connector and charge port of FIGS. 2 and 3 in a locked condition.

Turning now to FIG. 4, the locking mechanism is showed in the locked position wherein locking member 28 is fully extended into engagement with notch 54 of charging connector 20. In the locked condition, follower 32 has moved past the neutral position relative to cam surface 42 and to the opposite "over-center" position. The tension of biasing element 44 holds the follower in the over-center position shown, and so components 28-34 are held in the locked position. In this locked condition, the locking apparatus prevents or inhibits disengagement of charging connector 20 from the engaged charging position relative to charge port 14.

As may be seen by comparing FIG. 4 with FIG. 2, the locking apparatus may only be moved from the locked condition to the unlocked condition by pressing unlock actuator 50 and thereby pulling cable 46 toward the left. This movement of cable 46 draws components 28-34 to the left, moving follower 32 to a point just past (to the left of) the neutral position of the cam surface 42, whereupon tension in biasing element 44 pulls the follower 32 to the position shown in FIG. 2. Locking member 28 is then fully withdrawn from engagement with the charging connector 20, and the charging connector may then be disengaged from charge port 14 when/if desired.

Figure 5:
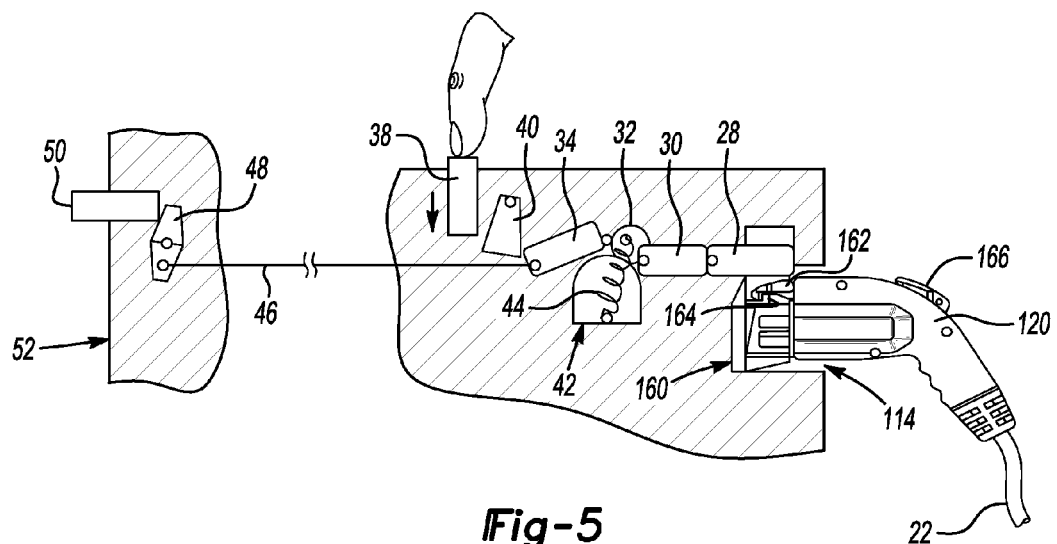
FIG. 5 is a schematic diagram illustrating a second embodiment of a charging connector and vehicle charge port in a locked condition.
Figure 6:
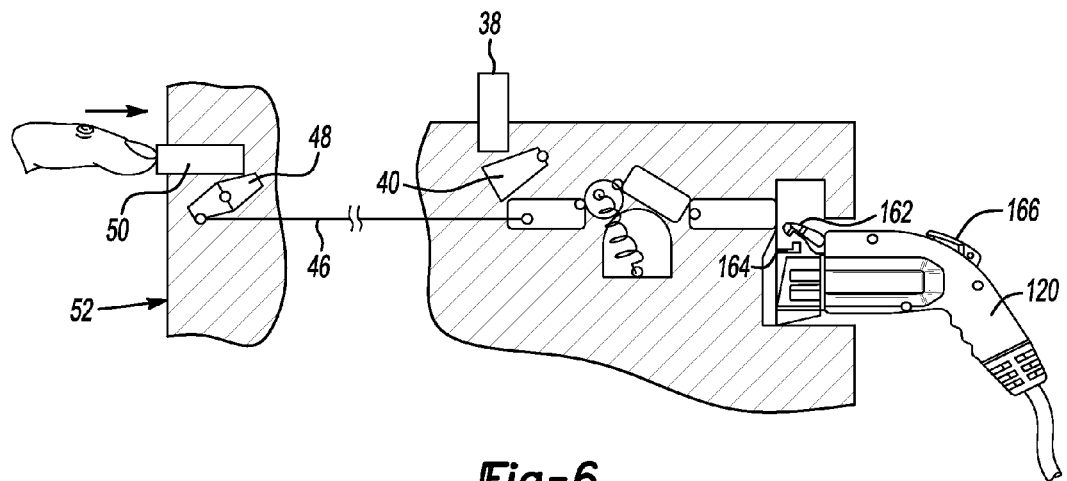
FIG. 6 schematic diagram of the charging connector and charge port of FIG. 5 in an unlocked condition.

FIGS. 5 and 6 depict in schematic form a second embodiment of a locking apparatus. Referring to FIG. 5, a charging connector 120 is shown inserted into a charge port 114 and in electrical connection with a mating connector 160. Charging connector 120 and mating connector 160 are shown generally similar to the corresponding components disclosed in co-pending U.S. patent application Ser. No. 12/796,256, the disclosure of which is incorporated herein by reference. Charging connector 120 includes a movable pawl or latch 162 that engages a mating detent 164 formed in a corresponding location on mating connection 160 when the charging connector is fully inserted into engagement with the mating connector. When pawl 162 is the engaged position shown in FIG. 5, downward pressure on locking actuator 38 operates the locking mechanism 28-40 and moves locking member 28 to the extended or locked position. In the locked position, locking member 28 is located in a blocking location above latch 162 so that the latch cannot rise upward out of engagement with detent 154.

In order to disengage latch 162 from detent 164, locking member 28 must be withdrawn to the unlocked position. This is accomplished as shown in FIG. 6 by pressing or otherwise actuating unlock actuator 50 to operate the linkage 28-48 in a manner similar to that described in relation to the first embodiment of FIGS. 2-4. When locking member 28 is in the unlocked, withdrawn condition shown in FIG. 6, latch 162 may rotate upward as shown to disengage from the detent 164. As disclosed in the above-referenced co-pending application, latch 162 may be rotated to the upward, unlatched position by depressing a button 166 located in a convenient position on the charging connector 120.

As may be seen from the above description, the disclosed embodiments of a vehicle charging security apparatus allow an authorized person to begin charging the vehicle battery and, so long as the vehicle's doors are locked, be confident that the charging connector can only be disengaged from the vehicle by a person who has access to the vehicle interior.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for locking a charging connector to a charge port of an electric vehicle, comprising:
    a lock member disposed in the electric vehicle and movable between a locked position wherein the lock member inhibits disengagement of the connector from the charge port and an unlocked position wherein the lock member allows disengagement of the connector from the charge port;
    a locking actuator adjacent to the charge port and manually actuatable to move the lock member to the locked position;
    an unlock actuator disposed inside a vehicle cabin and manually actuatable to move the lock member to the unlocked position; and
    a cam mechanism activated by actuation of the locking actuator to maintain the lock member in the locking position;
    wherein the cam mechanism comprises: a cam surface; and a follower operatively connected with the lock member and movable relative to the cam surface between a first over-center position wherein the lock member is in the locked position and a second over-center position wherein the lock member is in the unlocked position.

2. The apparatus of claim 1 further comprising a biasing element urging the follower to the first over-center position when the follower in on a first side of a neutral position and toward the second over-center position when the follower in on a second side of the neutral position.

3. The apparatus of claim 1 wherein actuation of the unlock actuator urges the follower to the second over-center position.

4. The apparatus of claim 3 wherein an inextensible member connects the unlock actuator with the follower, and actuation of the unlock actuator applies tension to the inextensible member to urge the follower to the second over-center position.

5. The apparatus of claim 4 wherein the inextensible member is a flexible cable.

6. The apparatus of claim 1 wherein the lock member, when in the locked position, extends into a mating hole in the charging connector.

7. The apparatus of claim 1 wherein the charging connector comprises a movable latch operable to selectively engage and disengage the charge port, the lock member in the locked position preventing movement of the latch out of engagement with the charge port, and wherein the lock member, when in the locked position, is in a blocking position preventing movement of the latch out of engagement with the charge port.

8. The apparatus of claim 1 wherein the lock member is linearly movable between the lock position and the unlock position.

9. The apparatus of claim 1 wherein the locking actuator is a push button.

10. Apparatus for charging a battery of an electric vehicle, comprising:
    a charge port mounted in the electric vehicle;
    a charging connector engageable with the charge port;
    a lock member moving relatively into the charge port and movable between a locked position wherein the lock member contacts the connector to inhibit disengagement of the connector from the charge port and an unlocked position wherein the lock member allows disengagement of the connector from the charge port;
    a locking actuator accessible outside of the vehicle and manually actuatable to move the lock member to the locked position;
    an unlock actuator accessible inside a vehicle cabin and manually actuatable to move the lock member to the unlocked position; and
    a cam mechanism activated by actuation of the locking actuator to maintain the lock member in the locking position, the cam mechanism comprising:
    a cam surface; and a follower operatively connected with the lock member and movable relative to the cam surface between a first over-center position wherein the lock member is in the locked position and a second over-center position wherein the lock member is in the unlocked position.

11. The apparatus of claim 10 wherein the lock member, when in the locked position, extends into a mating hole in the charging connector.

12. The apparatus of claim 10 wherein the charging connector comprises a movable latch operable to selectively engage and disengage the charge port, the lock member in the locked position preventing movement of the latch out of engagement with the charge port, and wherein the lock member, when in the locked position, is in a blocking position preventing movement of the latch out of engagement with the charge port.

13. Apparatus for locking a charging connector to a charge port of an electric vehicle, comprising:

a lock member disposed in the electric vehicle adjacent the charging connector and having an unlocked position wherein the lock member allows disengagement of the connector from the port, the lock member manually movable from outside the vehicle to a locked position wherein the lock member inhibits disengagement of the connector from the port;

an unlock actuator disposed inside a vehicle cabin and manually actuatable to move the lock member to the unlocked position;

a locking actuator adjacent to the charge port and manually actuatable to move the lock member; and a cam mechanism activated by actuation of the locking actuator to maintain the lock member in the locking position, the cam mechanism comprising a cam surface; and a follower operatively connected with the lock member and movable relative to the cam surface between a first over-center position wherein the lock member is in the locked position and a second over-center position wherein the lock member is in the unlocked position.

14. The apparatus of claim 13 wherein the lock member is moved to the locked position by manual actuation of the locking actuator.

15. The apparatus of claim 13 wherein the lock member, when in the locked position, extends into a mating hole in the charging connector.

16. The apparatus of claim 13 wherein the charging connector comprises a movable latch operable to selectively engage and disengage the charge port, the lock member in the locked position preventing movement of the latch out of engagement with the charge port, and wherein the lock member, when in the locked position, is in a blocking position preventing movement of the latch out of engagement with the charge port.

* * * * *